Figure 1:
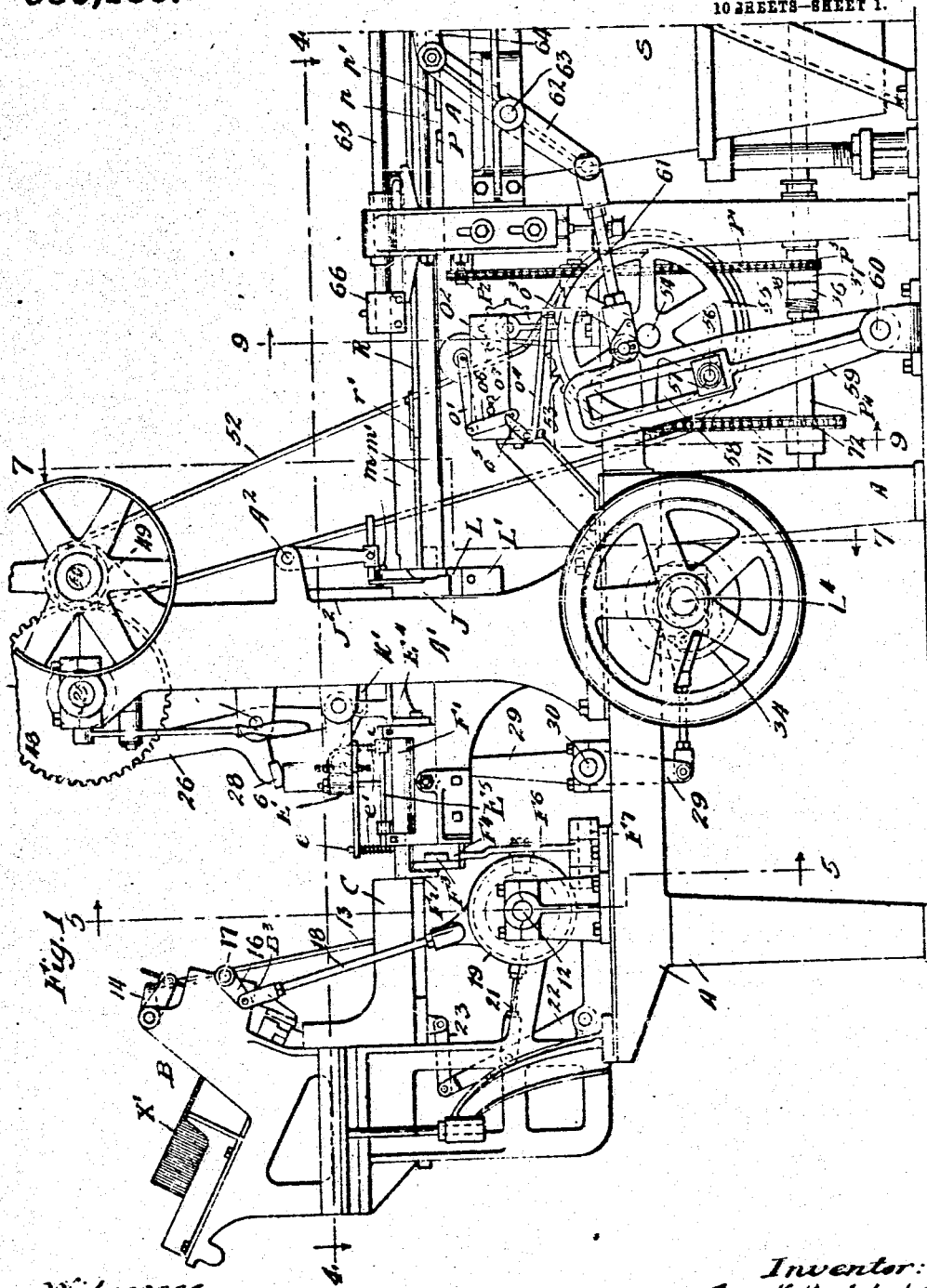

F. RUDOLPHI.
CAN BODY MACHINE.
APPLICATION FILED JULY 18, 1907.

956,180.  Patented Apr. 26, 1910.
10 SHEETS—SHEET 6.

Witnesses:  Inventor:
Frank Rudolphi
Attorneys

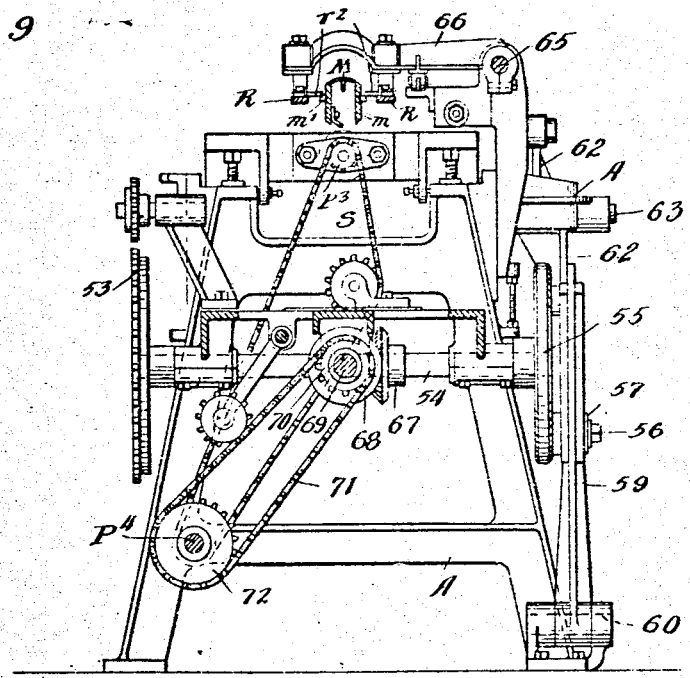

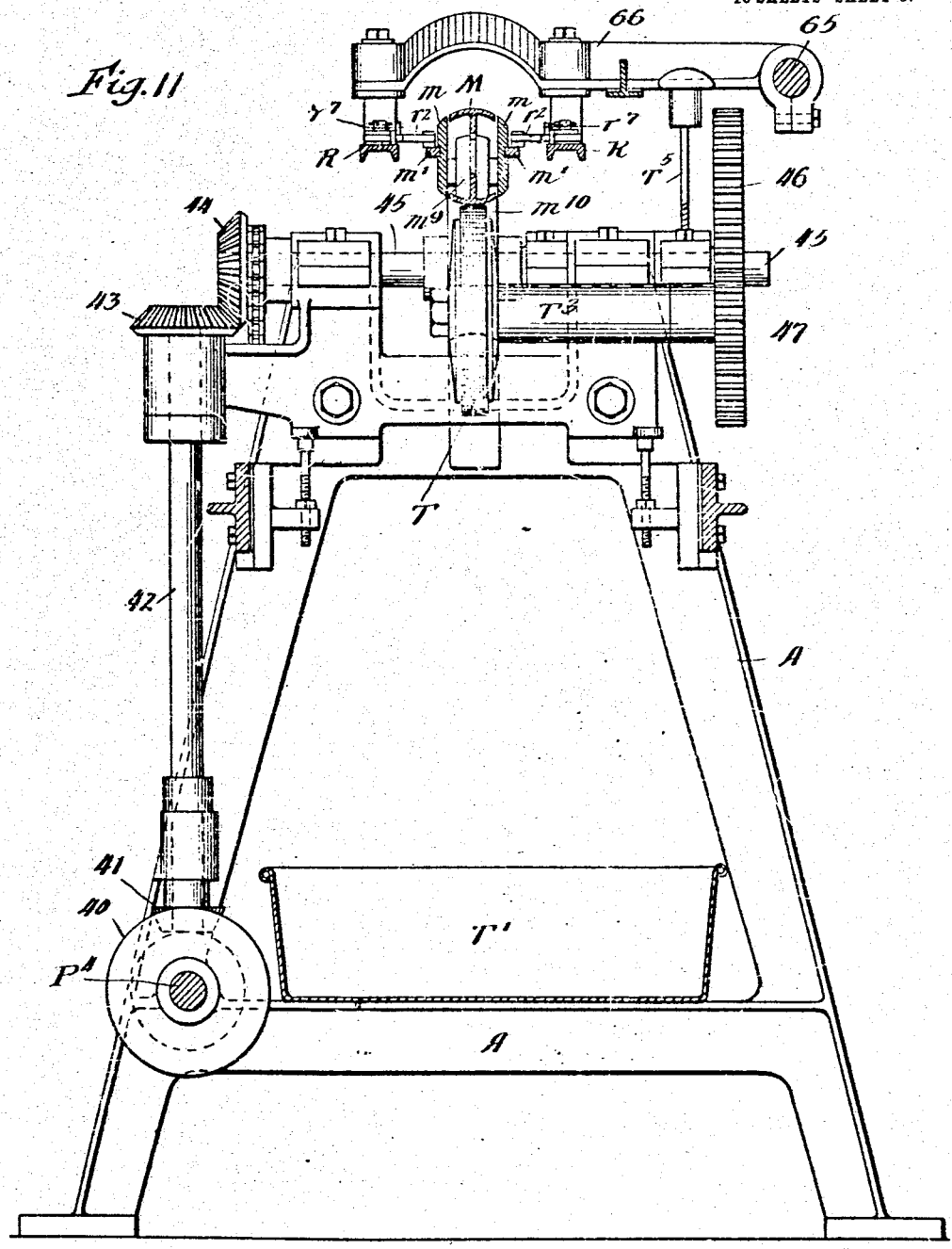

F. RUDOLPHI.
CAN BODY MACHINE.
APPLICATION FILED JULY 18, 1907.

956,180.  Patented Apr. 26, 1910.
10 SHEETS—SHEET 9.

Witnesses:
Wm. Geiger
N. M. Munday

Inventor:
Frank Rudolphi
By Munday, Evarts, Adcock & Clarke
Attorneys

F. RUDOLPHI.
CAN BODY MACHINE.
APPLICATION FILED JULY 18, 1907.
956,180.
Patented Apr. 26, 1910.
10 SHEETS—SHEET 10.
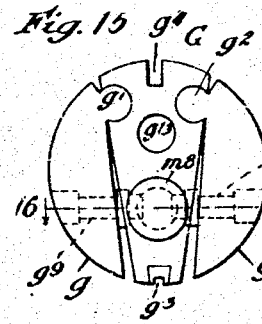
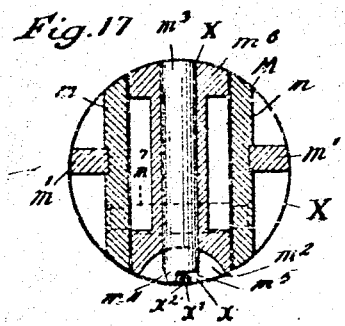
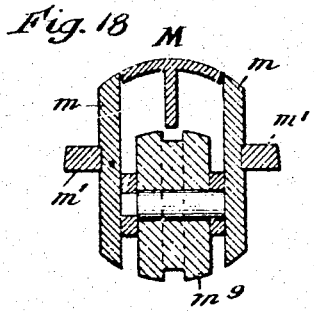
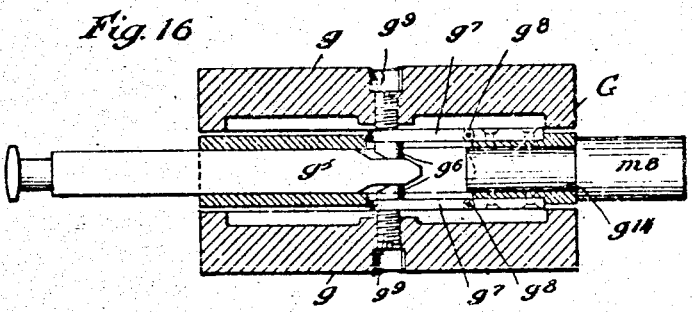
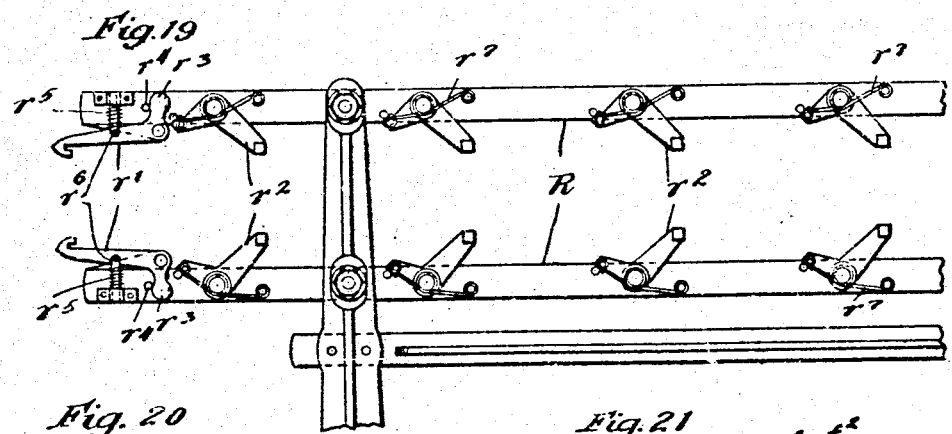
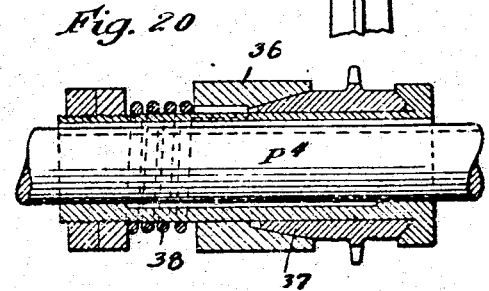
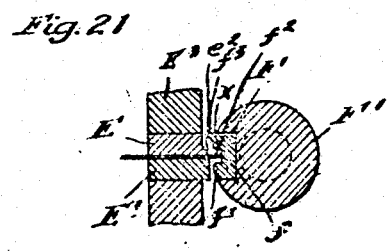
Witnesses.
Inventor:
Frank Rudolphi
By Munday, Evarts, Adcock & Clarke.
Attorneys

UNITED STATES PATENT OFFICE.

FRANK RUDOLPHI, OF CHICAGO, ILLINOIS, ASSIGNOR TO AMERICAN CAN COMPANY, OF NEW YORK, N. Y., A CORPORATION OF NEW JERSEY.

CAN-BODY MACHINE.

956,180.      Specification of Letters Patent.      Patented Apr. 26, 1910.

Application filed July 18, 1907. Serial No. 384,390.

*To all whom it may concern:*

Be it known that I, FRANK RUDOLPHI, a citizen of the United States, residing in Chicago, in the county of Cook and State of Illinois, have invented a new and useful Improvement in Can-Body Machines, of which the following is a specification.

My invention relates to improvements in can body making machines, and more particularly to machines for making lock side seam can bodies.

The object of my invention is to provide an automatic lock side seam can body making machine of a simple, efficient and durable construction by means of which can bodies may be automatically, rapidly and cheaply and perfectly manufactured, and can bodies produced of uniform size or diameter, and by means of which the soldered side seams may be made uniformly perfect and hermetically tight with a minimum amount of solder and without smearing or coating either the interior or exterior surface of the can body with solder adjacent to the side seam.

In manufacturing or producing from flat rectangular can body blanks sheet metal cans of uniform size or diameter, having lock side seams, with the solder properly sweated through or between the several folds of the lock seam, it is necessary that a number of successive operations be performed upon the can body blank, such as feeding the same one by one from a stack or pile of blanks, the carrying or moving of the blank through the machine to the several operating devices, forming oppositely turned hooks or edge folds on the opposite ends of the blank, properly guiding or presenting the blank to the edging, folding or hook forming devices and properly clamping it during the edge folding or hook forming operation, so that the hooks or edge folds may be formed of proper width and in proper relation to the blank, the forming of the blank into the cylindrical or other shape of the can body, the proper interlocking or drawing together of the hooks or edge folds, the bumping or closing of the seam, the proper clamping of the blank on the body former horn preparatory to the forming or folding of the blank around the horn, the proper sizing of the can body preparatory to the bumping or seam closing operation, the ejection or removal of the formed can body from the body former horn and its delivery in proper position to the soldering horn and devices, the fluxing of the seam preparatory to the soldering operation, the heating of the joint and the application of solder thereto and sweating of the solder into the seam, the removal of surplus solder from the outside of the can body and finally discharging the finished can body from the machine. And as the capacity of rapidity of operation of the machine is, of course, limited by the slowest of its many coöperative parts, it is essential to the practical accomplishment of the object of my invention, and the production of a machine capable of turning out perfect can bodies at a high rate of speed, that all the several coöperative parts of the machine be specially selected and designed for efficient coöperation with each other to the end that the machine as a whole may have the capacity and efficiency of operation required.

With the new can body machine which I have devised, I am enabled to produce perfectly soldered lock side seam can bodies of uniform size and diameter at the rate of one hundred and twenty-five per minute.

The can body making machine embodying my invention shown in the accompanying drawing forming a part of this specification comprises in coöperative combination, a feed device for feeding the blanks one by one from a stack or pile, guides for the can body blanks, an intermittently moving conveyer for the blanks for moving each blank first to the edge folding or hook forming devices, then to an intermediate station between the hook formers and the body former horn and then to the body former horn, two pairs of clamp devices for clamping the ends of the blank during the edge folding operation, an intermediate clamp for clamping the middle portion of the blank during the hook forming operation, a pair of rotary or rocking hook formers or edge folders operating in conjunction with the pairs of end clamps to form reversely turned hooks or edge folds on the opposite ends of the blank, each in part by the downward and in part by the upward rocking movement of the hook former, an expansible and collapsible body former horn arranged below the guides for the can body blank, a clamp or device above the horn for clamping the middle portion of the blank against the horn preparatory to the body forming operation, movable guides for supporting the outer ends of the blank in position above the horn, and which are adapted to be withdrawn out of the way of the blank as it is folded downward around the horn, body formers around the horn for folding the can body blank downward around the horn and to cause the oppositely turned hooks or edge folds on the blank to lap past each other so that they will interengage as the horn expands to draw the hooks together and size the can body preparatory to the bumping or seam closing operation, a reciprocating bumper or seam closing device for closing the seam, a soldering horn connected to the end of the body former horn, a fluxing or aciding device below the soldering horn, a molten solder bath or vessel below the horn, a rotating solder applying roller revolving in the molten solder in line with the soldering horn for applying the solder to the side seams of the can bodies, the same being preferably furnished with a plurality of solder applying cylindrical surfaces, each of a shorter length than the can body, a reciprocating carrier or conveyer for advancing the can bodies step by step along the soldering horn, a rotary wiper for removing the surplus solder from the outside surface of the can body adjacent to the seam and means for operating or imparting to the several coöperative moving devices or parts of the machine, the required movements.

Figure 2:
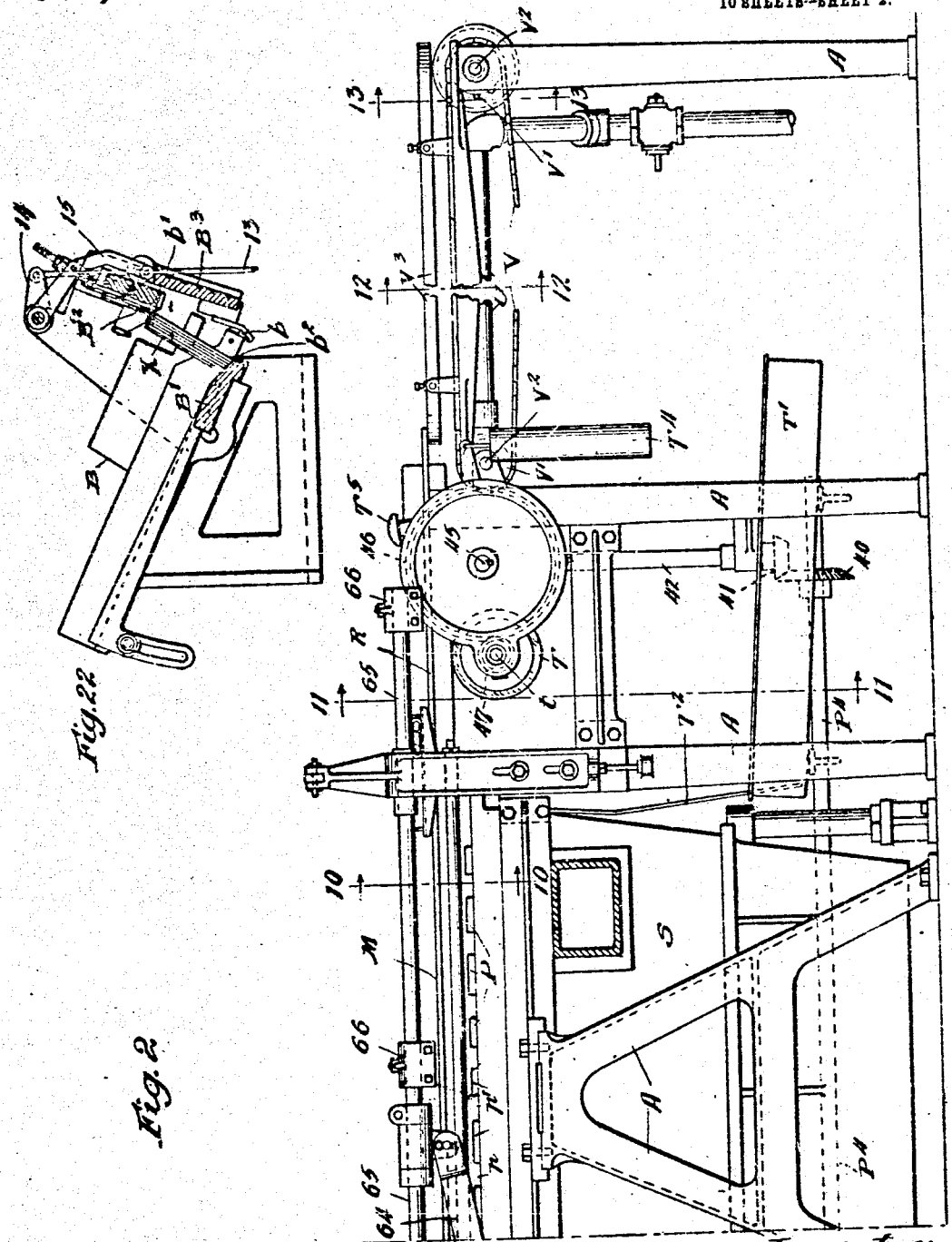
Figure 3:
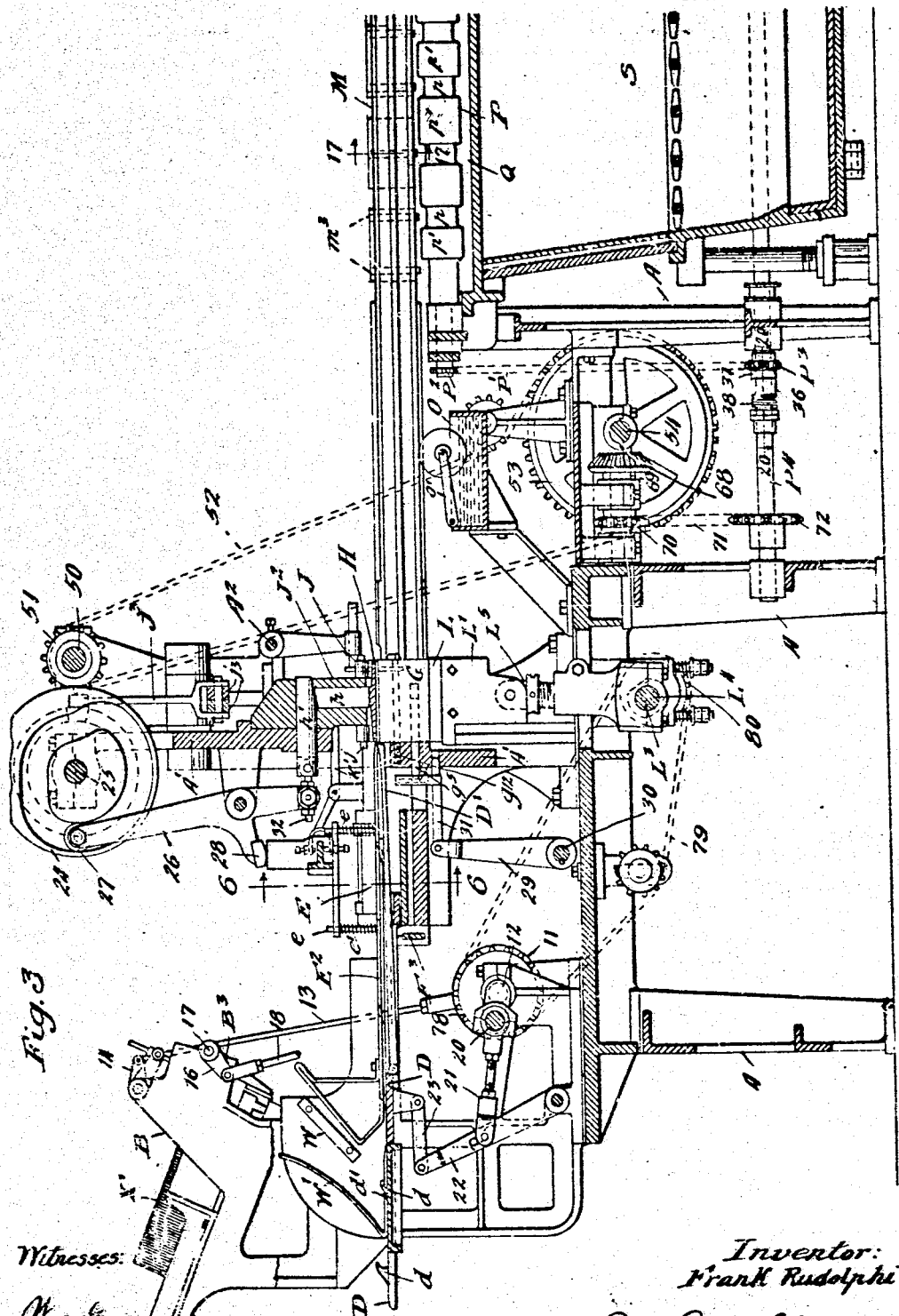
Figure 4:
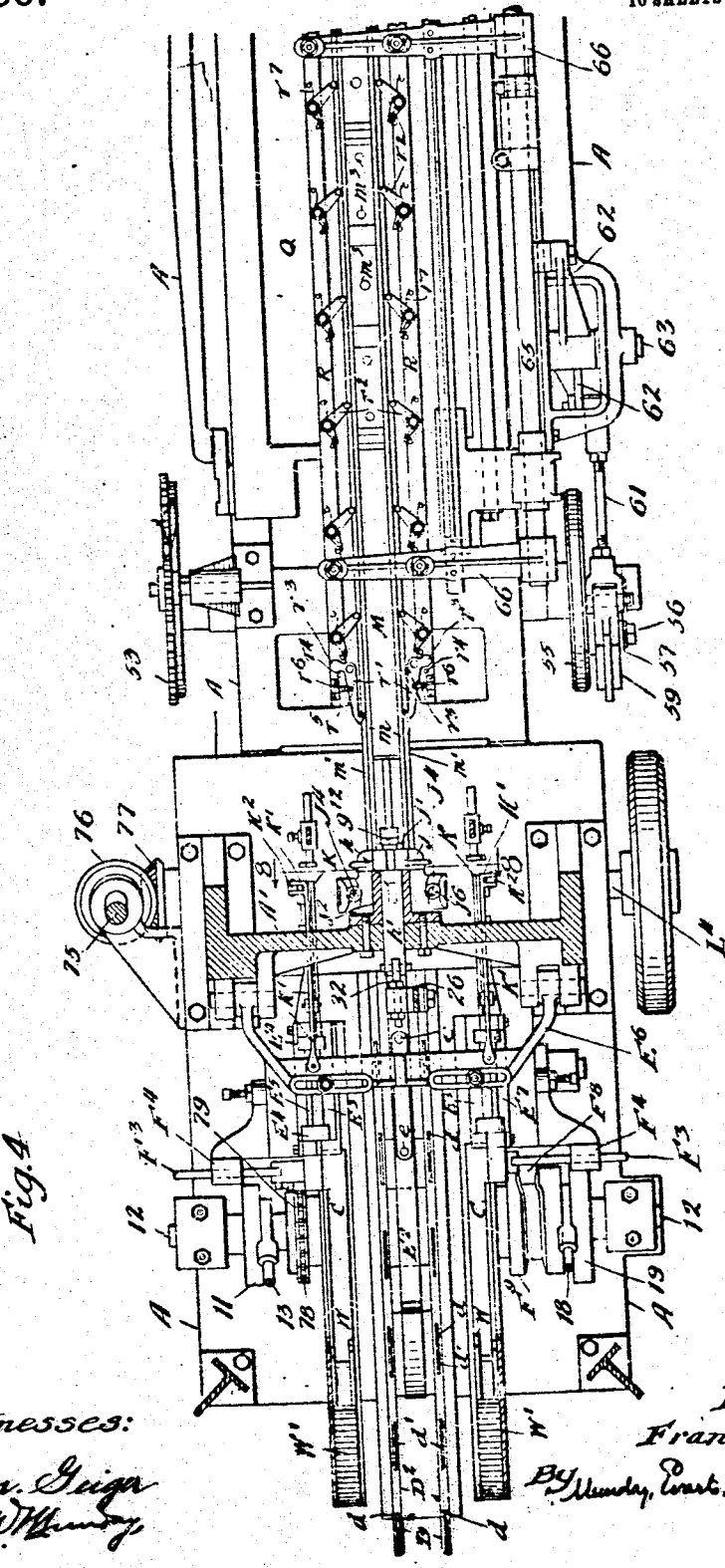
Figure 5:
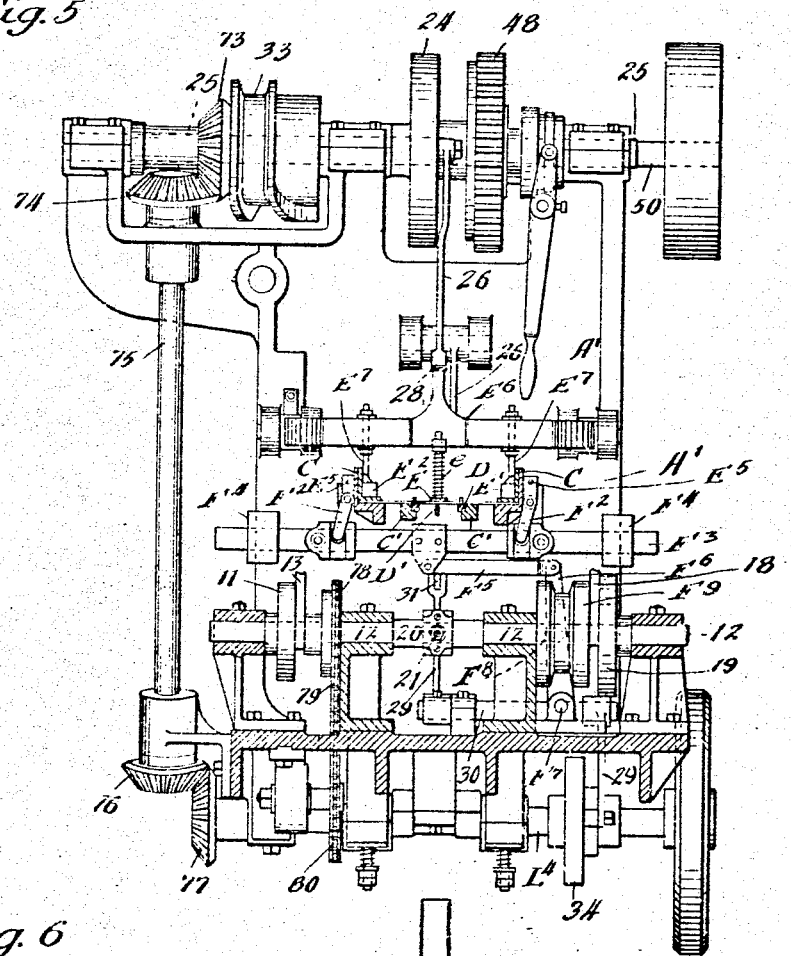
Figure 6:
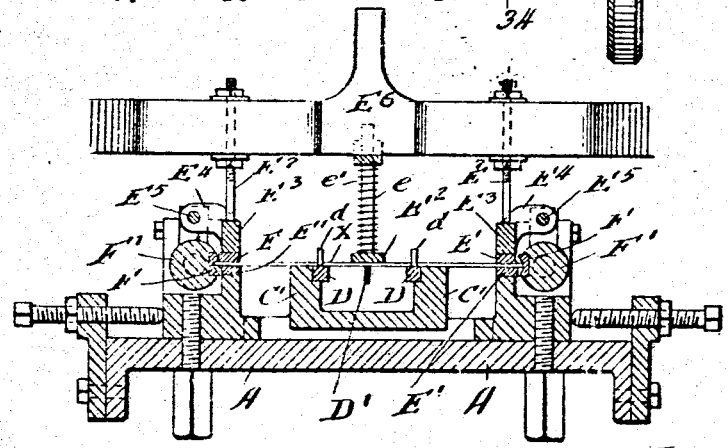
Figure 7:
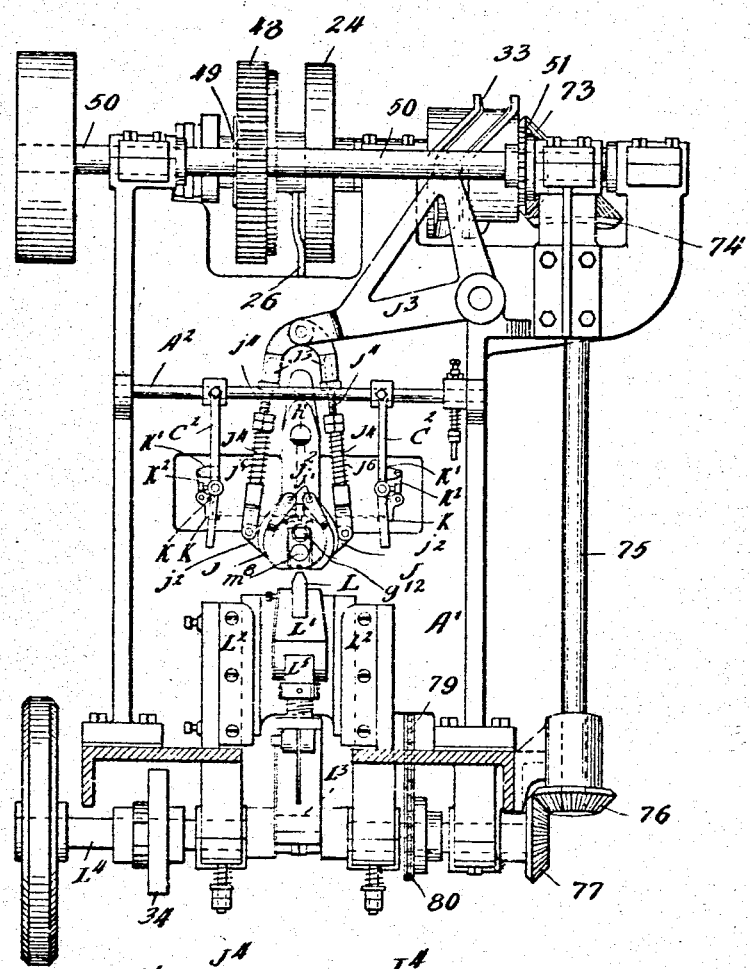
Figure 8:
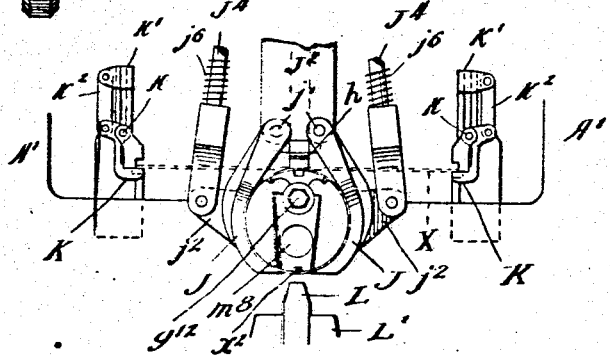
Figure 12:
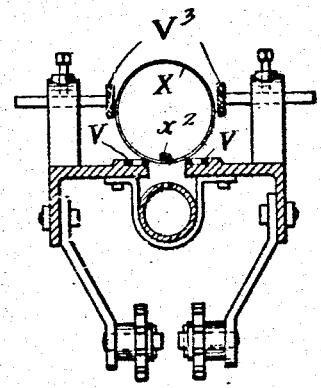
Figure 13:
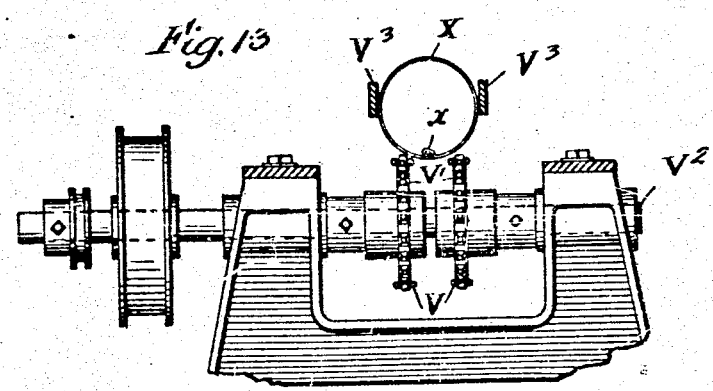
Figure 14:
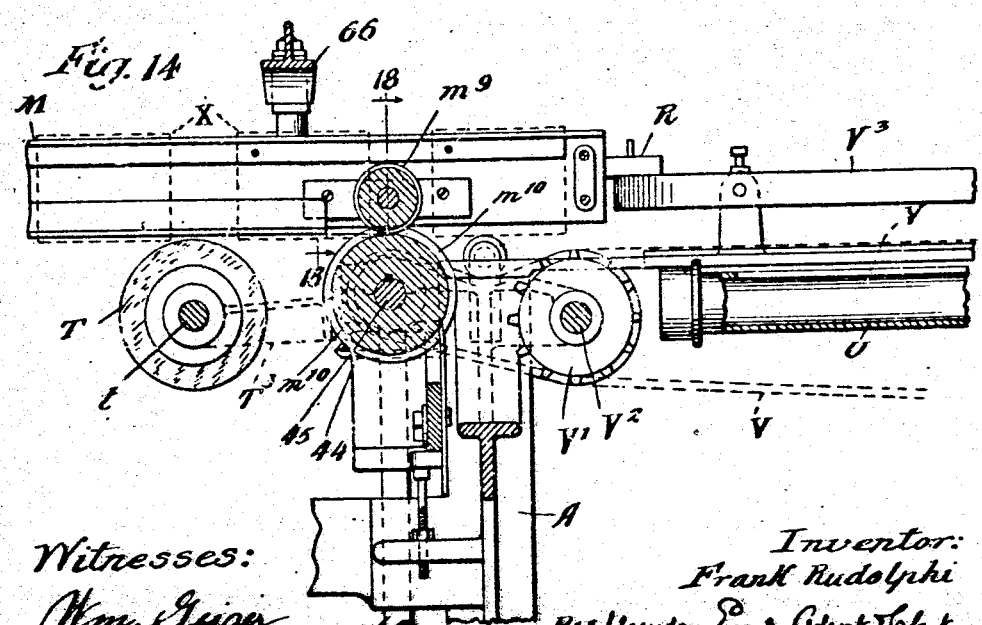

In said drawing, Figures 1 and 2 taken together are a side elevation of the lock side seam can body forming and side seam soldering machine embodying my invention. Fig. 3 is a partial central vertical longitudinal section. Fig. 4 is a partial plan view partly in horizontal section on line 4—4 of Fig. 1. Fig. 5 is a vertical cross section on line 5—5 of Fig. 1. Fig. 6 is a vertical section on line 6—6 of Fig. 3. Fig. 7 is a vertical section on the broken line 7—7 of Fig. 1. Fig. 8 is a detail vertical section on line 8—8 of Fig. 4. Figs. 9, 10, 11, 12, and 13 are vertical sections on lines 9—9, 10—10, 11—11 12—12 and 13—13 respectively of Figs. 1 and 2. Fig. 14 is a detail elevation partly in vertical section showing the outer end of the soldering horn and adjacent parts. Fig. 15 is an end view of the body former horn. Fig. 16 is a horizontal section of the body former horn on line 16—16 of Fig. 15. Fig. 17 is a cross section of the soldering horn on line 17—17 of Fig. 3. Fig. 18 is a cross section of the soldering horn on line 18—18 of Fig. 14. Fig. 19 is a detail partial plan view of the reciprocating can body conveyer for moving the can bodies along the soldering horn. Fig. 20 is a detail section on line 20—20 of Fig. 3. Fig. 21 is a detail vertical section showing one of the hook formers or edge folders. Fig. 22 is a vertical longitudinal section of the can body blank feeder.

In the drawing, A represents the frame of the machine.

B is the blank feed device, C C the guides for the blanks, D the reciprocating blank conveyer, $D^1$ the can body ejector or device for removing or delivering the can body from the body former horn to the soldering horn, E $E^1$ the coöperating clamps for holding the opposite ends of the blank during the hook forming operation, $E^2$ the movable clamp for the middle portion of the blank, F F the rotary or rocking hook formers or edge folders, G the body former horn, H the clamp for clamping the middle portion of the blank against the horn, J the body formers or wings which wrap or form the flat can body blank around the horn, K K movable guides for supporting the ends of the blank above the horn, L the bumper or seam closer, M the soldering horn, O the fluxing device, P the solder applying roller, Q the molten solder bath or vessel, R the can body carrier for moving the can bodies along the soldering horn, S the furnace or heater and T the wiper or device for removing surplus solder from the outside of the can body.

The can body blanks X are automatically fed one by one from the pile or stack of blanks $X^1$ in the blank holder $B^1$ of the feeder B and delivered thereby to the blank conveyer D.

The blank feeder B preferably has a shoulder $b$ which projects from the inner face of the feeder about the thickness of one of the blanks X so as to engage the lowermost blank only of the pile and shift or slip it upward into the slot $b^1$ of the feeder safeguard device or separator $B^2$ and thus disengage the blank from the lip $b^2$ of the blank holder $B^1$. The feeder has two movements, one a sliding or reciprocating movement to slip the disengaged blank into the slot $b^1$ of the separator $B^2$ and disengage the lower edge of the blank from the lip $b^2$ of the holder $B^1$ and the other movement being a swinging or lateral one to permit the blank to drop down upon the blank conveyer D. To provide for this double movement of the feeder B, it is mounted to slide in a pivoted or swinging guide $B^3$.

The guides C C for supporting the blanks and guiding the same as they are moved forward by the blank conveyer D so as to present the blank in proper relation to the hook formers or edge folders E, preferably consist of angle bars secured to the stationary frame of the machine.

$C^1$ $C^1$ are intermediate guides to properly support the middle portion of the blank.

The blank conveyer D preferably consists of a pair of reciprocating bars or slides reciprocating in suitable guides or ways $D^2$ on the frame of the machine, furnished with a series of pairs of fingers or pawls $d$, each having a spring $d^1$ and which fingers or pawls engage the blank and push it forward. The blank conveyer bars or slides advance the can bodies forward by a step by step movement first to the hook formers E, then to an intermediate station or space between the hook formers and the body former horn G and then to the body former horn, and then the can body ejector $D^1$ pushes the can body off the body former horn onto the soldering horn along which it is then advanced by a step by step movement by the carrier or conveyer R of the soldering mechanism. The ejector $D^1$ is preferably connected to the blank conveyer D and operated therefrom.

E $E^1$ and E $E^1$ are two pairs of clamps adapted to grasp the can body blank X near its ends while the rotary or rocking edge folders or hook formers F form the oppositely turned edge folds or hooks $x$ $x^1$ on the opposite ends of the blank X. The lower clamp $E^1$ of each pair is mounted on the stationary frame of the machine and the upper clamp of each pair is the movable member and opened from and closed against the lower member to admit the blank between them and to clamp the same. One clamp of each pair E $E^1$ is provided with a hook forming lip $e^2$ over which the hook or edge fold $x$ or $x^1$, as the case may be, is formed or bent, the hook forming lip $e^2$ being on the upper clamp E to form the upturned hook $x$, and on the lower clamp $E^1$ at the opposite end to form the downturned hook or edge fold $x^1$. The upper clamps E E are preferably secured to movable bars $E^3$ having arms $E^4$ hinged at $E^5$ to the frame of the machine. The intermediate clamp $E^2$ is preferably pressed yieldingly against the middle portion of the blank by a spring $e$ surrounding a pin $e^1$ by which the movable clamp $E^2$ is connected with the movable cross bar $E^6$. The upper segments E E are preferably forced down to firmly clamp the blank between the upper clamps E E and lower clamps $E^1$ $E^1$ by means of the cross bar $E^6$ which is furnished with adjustable screws or pins $E^7$ to engage the movable bars $E^3$ to which the upper clamps E are secured. The upper or movable clamps E rest normally with their own weight and with that of their holder bars $E^3$ on the blanks X as they are fed or conveyed forward beneath the same by the blank conveyer D and in connection with the middle clamp $E^2$ serve not only to straighten, smooth and flatten the blanks, but also to prevent danger of the blanks being overcarried by the conveyer D in its quick or rapid reciprocating movement, thus insuring the blanks being always properly presented to the hook folders or edge formers F F. The intermediate guides $C^1$ $C^1$ on the frame of the machine opposite the intermediate spring actuated clamp bar $E^2$ coöperate with said clamp bar $E^2$ to smooth, flatten out or straighten the blank so that the rocking hook formers and coöperating clamps for the edges of the blank will form hooks or edge folds of uniform width on the blank and thus enable these rocking hook formers to properly coöperate with the expansible body former horn in producing can bodies of uniform size or diameter and of equal diameter at the two ends of each can body.

Each of the two rotary or rocking hook formers or edge folders F is secured to a rocking holder $F^1$ by or through which the necessary or rocking movement is imparted to it. The two rocking hook formers F are alike and are reversely mounted or disposed so that one will form an upturned hook and the other a downturned hook. Each of these hook formers F is furnished with a longitudinal recess or groove $f$ to receive the projecting end of the blank X and serve as a guide therefor in adjusting the position of the blank between the two hook formers F F. Each of the hook formers F is also provided with a projecting shoulder or bead $f^1$ which engages the projecting end of the blank and bends it at right angles to the plane of the blank when the hook former is rocked in one direction and also with a further shoulder or bead $f^2$ and projecting lip $f^3$ which serve when the hook former is rocked in the opposite direction to complete the formation of the hook $x$ or $x^1$ as the case may be from the forming lip $e^2$ of the clamp D or $D^1$ as the case may be. After the formation of the hook is thus completed, the hook former F returns to its central or normal position ready to receive the next blank.

The body former horn G is expansible and collapsible or provided with movable segments or wings $g$, preferably hinged to the main portion of the horn by pivot projections $g^1$ $g^2$. The horn is thus adapted to collapse while the can body blank X is wrapped around the horn, and the edge folds or hooks $x$ $x^1$ thereof carried past each other so that they may interlock or draw together, and also adapted to expand to draw the hooks $x$ $x^1$ snugly together preparatory to the bumping or closing of the seam, and also to again collapse or contract to enable the can body to be readily extracted or pushed off the horn. The horn G has at its lower part a groove $g^3$ to receive the lock seam so that the seam will project on the inside of the can body and leave the exterior surface of the can body smooth at the lock seam. The horn G has at its upper part a guide groove $g^4$ to receive the reciprocating can body extractor $D^1$ by which the can body is pushed off the body former horn onto the soldering horn. The wings or segments of the horn are thus expanded or spread apart at intervals as required, by means of a wedge $g^5$ mounted to reciprocate in the main portion of the horn, and which engage wedge blocks $g^6$ on arms $g^7$ hinged to the horn at $g^8$ and which bear against adjusting screws $g^9$ on the movable wings or segments $g$ of the horn. The horn G is supported from the upright web or plate $A^1$ of the frame by a longitudinal bolt $g^{12}$ extending through a hole $g^{13}$ in the horn.

The movable clamp H above the horn which clamps the middle portion of the can body blank against the horn is preferably furnished with or secured to a wedge block $h$ and is operated as required by a horizontally reciprocating wedge $h^1$.

The body formers J J which wrap, form or shape the flat can body blank around the body former horn G are preferably substantially semi-cylindric wings hinged at $j^1$ to the stationary block or member $J^2$ on the frame of the machine, and are opened and closed around the horn as required by a lever $J^3$ connected by links $J^4$ with arms $j^2$ on the body former wings or segments J. The connecting links $J^4$ are preferably furnished with adjustable members $j^3$ $j^4$ having interposed springs $j^5$ to give a yielding connection between the operating lever $J^3$ and the body former wings or segments J J.

The movable guides K K which support the outer ends of the flat blank X above the horn are preferably hinged to the frame of the machine at $k$ and operate to open and close as required by levers $k^1$ connected to the movable guides K by links $k^2$.

The stationary guides $C^1$ which coöperate with the movable guides K K in guiding the blank $X^1$ in proper relation to the body former horn G are supported on the frame of the machine, preferably by adjustable arms $C^2$ on the cross rod $A^2$ of the frame.

The bumper or seaming closing device L which is mounted below the horn is secured to a reciprocating slide $L^1$ mounted in suitable guides $L^2$ on the frame of the machine and operate by a crank $L^3$ on the cam shaft $L^4$ through the connecting link $L^5$.

The soldering horn M is preferably of skeleton form or made up of longitudinal bars $m$ $m^1$, and it is furnished at its under side with a large longitudinal channel $m^2$ so that the lock side seam $x^2$ and the adjacent arc of the can body on each side of the lock side seam will not come in direct contact with the soldering horn, thus keeping the soldering horn entirely free from danger of becoming in any way smeared with solder from the solder applied to or sweated through the seam in the soldering operation. To keep the can body X from turning on the soldering horn and the side seam $x^2$ thereof in proper register with the fluxing device O and the solder applying roller or device P, the solder horn is provided at intervals with a plurality of guide pins $m^3$, each having at its lower end a guide lip $m^4$ and a notch $m^5$. These guide pins are preferably secured to blocks $m^6$ secured to the longitudinal bars $m$ of the horn by cross pins $m^7$. The guide pins $m^3$ are preferably located a less distance apart than the length of the can bodies so that the side seam of each can body may engage two of the guide lips $m^4$ at a time. The guide lips $m^4$ are on that side of the lock side seam $x^2$ of the can body which opposes turning of the can body on the soldering horn under action of the longitudinally extending and rotating solder applying roller P. The soldering horn M has at its inner end a removable stud $m^8$ fitting in a socket $g^{14}$ at the outer end of the body former horn G. And at its outer end the soldering horn M is furnished with a roller $m^9$ which rests upon a roller $m^{10}$ on the frame of the machine to support the outer end of the horn and enable the can bodies to pass easily off the horn. To facilitate the discharge of the soldered can bodies from the soldering horn M the supporting roller $m^{10}$ is preferably continuously rotated.

The fluxing device O is arranged beneath the soldering horn between the body former horn G and the solder applying roller P and preferably consists of a roller mounted on a hinged arm $O^1$ and rotating in the flux or acid receptacle $O^2$. This flux applying roller is pressed upwardly against the can bodies as they move along the soldering horn M by a spring or weight $O^3$ on the lever $O^4$ having an arm $O^5$ engaging an arm $O^6$ on the lever $O^1$ upon which the flux applying roller is mounted. An adjustable stop $O^7$ limits the upward movement of the flux applying roller. The flux applying roller need not be positively driven as it will be rotated by contact with the passing cans.

The solder applying roller P is mounted to rotate in the molten solder in the solder pot or receptacle Q and is arranged parallel to the soldering horn M directly below and parallel to the same so as to engage at the upper part of its periphery the lock side seam of each can body as the same is moved along over the solder applying roller on the soldering horn M. The solder applying roller P is preferably made sectional or provided with transverse annular channels $p$ which separate its solder applying surfaces into separated sections $p^1$. The solder applying roller contacts tangentially with each can body as it moves over the same on the soldering horn. The solder applying roller is preferably rotated as required to present a constantly fresh solder coated surface to the seams of the cans as they pass by means of a sprocket chain $P^1$ and sprocket gear $P^2$ on the roller P and the sprocket gear $P^3$ on the shaft $P^4$. As the soldering horn has a wide free open channel at its lower portion adjacent to the lock seam of the can body, the solder applying roller only comes in contact with the can body and does not touch or apply any solder to the soldering horn itself when no can bodies are passing along the horn over the soldering roller.

The can body conveyer R for moving the can bodies along the soldering horn M preferably imparts to the can bodies an intermediate or step by step movement, and preferably, consists in a pair of reciprocating bars, one on each side of the body former horn and furnished with spring pawls $r^1$ $r^1$ and a series of can body pusher fingers or pawls $r^2$ $r^2$. The hook pawls $r^1$ $r^1$ have arms $r^3$ which engage stop pins $r^4$ and are held yieldingly in position by springs $r^5$ on pins $r^6$. The can body pusher fingers $r^2$ are held yieldingly in position by springs $r^7$.

The wiper T preferably consists of a rotary brush mounted on a transverse shaft $t$ below the soldering horn. As the can bodies pass along the horn, the brush will come in contact with the outside surface of the seam and can body adjacent to the seam and remove the surplus solder therefrom.

U represents the cooling device, the same consisting preferably of an air blast pipe having jet openings or slot for projecting compressed air against the seams of the cans as they are moved along over the same by the carrier V consisting preferably of a pair of sprocket chains mounted upon sprocket wheels $V^1$ on the transverse shafts $V^2$, $V^2$. To keep the can bodies in position on the cooler chains, stationary guides $V^3$ are provided.

Below the blank feeder B and above the blank conveyer D I provide an inclined guide W for directing the blank after being released from the blank holder down upon the blank conveyer and also a curved guard $W^1$ to stop the blanks in position to be properly engaged by the fingers or pawls of the conveyer slide E.

The necessary movements may be imparted to the several moving parts or devices of my machine by any suitable driving or connecting mechanism. I, however, prefer to employ for this purpose the driving or connecting mechanism illustrated in the drawing.

The required sliding or reciprocating movement is imparted to the blank feeder by a cam 11 on a transverse shaft 12 through connecting link 13, lever 14 and connecting link 15. The required pivotal or swinging movement is communicated to the feeder B or its swinging guide $B^3$ by means of an arm 16 on the rock shaft 17, link 18 and cam 19 on said shaft 12.

The blank conveyer D is preferably reciprocated as required by means of a crank 20 on the transverse shaft 12 through a connecting link 21, lever 22 and link 23 which is pivotally connected to the conveyer slide B.

The upper or movable clamps E E are moved up and down as required to clamp the blank for the edge folding operation through the cross bar $E^6$ by means of a cam 24 on the main cam shaft 25 through the connecting lever 26 having a roller 27 engaging said cam and an arm 28 engaging said cross bar $E^6$.

The edge folders or hook formers F are rocked as required to form the hooks or edge folds by their rocking holders $F^1$ having arms $F^2$ through connecting bar $F^3$ reciprocating in guides $F^4$, link $F^5$ connected to a lever $F^6$ pivoted to the frame at $F^7$ and having a roller $F^8$ engaging the cam $F^9$ on the main cam shaft 12.

The wedge $g^5$ by which the segments of the horn are expanded as required, is reciprocated by means of an arm or lever 29 on the shaft 30 through the connecting link 31, the lever 29 being vibrated as required by cam 34 on cam shaft $L^4$.

The movable clamp H by which the middle portion of the blank is clamped against the horn preparatory to the operation of the body former wings J J, is preferably operated as required by a reciprocating wedge $h^1$ which is connected to the lever 26 by a link 32.

The lever $J^3$ by which the body former wings J J are operated is actuated by a cam 33 on the shaft 25.

The levers $k^1$ by which the movable guides K are opened and closed are actuated as required preferably by the cross bar $E^6$ which actuates the clamps E and $E^1$.

A friction clutch 36, 37 having tension spring 38 is inserted on the shaft $P^4$ through which motion is communicated to the solder roller P so that in case the molten solder becomes too cold or set, the rotation of the solder roller P may cease without stopping or injuring the remaining parts of the machine. This also facilitates starting the machine in case the solder should not be first properly melted.

The rotary wiper T is preferably driven from the shaft $P^4$ through bevel gears 40 and 41 on shaft 42 having gear 43 meshing with gear 44 on shaft 45 carrying gear 46 meshing with gear 47 on wiper shaft $t$. The solder removed by the rotary buffer or wiper T drops into a collecting pan $T^1$, being deflected into the same by the shield $T^2$.

The rotary buffer T is preferably mounted on a swinging arm $T^3$ journaled on shaft 45 and provided with a weight $T^4$ to hold it yieldingly against the can bodies. An adjusting screw $T^5$ limits the downward movement of the rotary buffer.

The can body conveyer R is reciprocated as required from the shaft 25 by a gear 48 therein meshing with gear 49 on main driving shaft 50 having sprocket wheel 51 and chain 52 meshing with sprocket wheel 53 on shaft 54 having crank wheel 55 and stud 56 engaging block 57 shouldered in slot 58 in arm 59 pivoted to the frame at 60 and connected by link 61 with bell crank lever 62 pivoted at 63 to the frame and connected by link 64 with the conveyer sliding rod 65 which has arms 66 supporting the conveyer boss R R.

The shaft P⁴ is preferably driven from the shaft 54 having bevel gear 67 meshing with gear 68 on shaft 69, having sprocket wheel 70, and chain 71 which engages a sprocket wheel 72 on shaft P⁴.

The shaft L⁴ is preferably driven from the shaft 25 having bevel gear 73 meshing with gear 74 on shaft 75 having bevel gear 76 meshing with gear 77 on the shaft L⁴.

The shaft 12 through which the feeder, the blank conveyer slide, and the edge folders are operated is preferably driven by a sprocket wheel 78 on said shaft 12, chain 79, and sprocket wheel 80 on the shaft L⁴.

I claim:—

1. In a can body making machine, the combination with a can body blank feeder for automatically feeding the blanks one by one from a stack or pile, of a reciprocating can body blank conveyer furnished with pawls for feeding the blanks forward, two pairs of can body blank holding clamps, one clamp of each pair having an edge folding lip, a pair of rocking hook formers, an expansible and collapsible body former horn, a movable clamp to clamp the middle portion of the blank against the horn, a pair of body former wings above said horn for wrapping the blank into a can body around the horn, a reciprocating bumper below said horn for closing the seam against the horn, a soldering horn connected to the end of the body former horn, a fluxing device below the horn, a solder receptacle, a solder applying roller parallel to and below the horn, a conveyer for moving the can bodies along the soldering horn, a wiper for removing surplus solder from the outside of the can body, a cooling device to cause the solder to quickly set and mechanism for operating or imparting to the several co-operative moving parts or devices of the machine their required movements, substantially as specified.

2. In a can body making machine, the combination with two pairs of can body blank holding clamps, one clamp of each pair having an edge folding lip, a pair of rocking edge folders, an expansible body former horn in advance of and below said edge folders, folder wings above said horn for wrapping the blank around the horn, a bumper below said horn, a soldering horn, a fluxing device below the horn, a solder receptacle and a solder applying roller parallel to and below the horn, substantially as specified.

3. In a can body making machine, the combination with the body former horn, folder wings above said horn and a bumper below said horn, of a soldering horn having a longitudinally extending open channel at its lower portion, a molten solder bath or receptacle and a solder applying roller below and parallel to the soldering horn, substantially as specified.

4. In a can body making machine, the combination with the body former horn, folder wings above said horn and a bumper below said horn, of a soldering horn having a longitudinally extending open channel at its lower portion, a molten solder bath or receptacle and a solder applying roller below and parallel to the soldering horn, and a conveyer for moving the can bodies along the soldering horn, substantially as specified.

5. In a can body making machine, the combination with the body former horn, folder wings above said horn and a bumper below said horn, of a soldering horn having a longitudinally extending open channel at its lower portion, a molten solder bath or receptacle, a solder applying roller below and parallel to the soldering horn and means for moving the can bodies along the horn step by step, substantially as specified.

6. In a can body making machine, the combination with the body former horn, folder wings above said horn and a bumper below said horn, of a soldering horn having a longitudinally extending open channel at its lower portion, a molten solder bath or receptacle, a solder applying roller below and parallel to the soldering horn, said solder applying roller having transverse annular channels dividing its periphery into a series of sections, substantially as specified.

7. In a can body making machine, the combination with the body former horn, folder wings above said horn and a bumper below said horn, of a soldering horn having a longitudinally extending open channel at its lower portion, a molten solder bath or receptacle, a solder applying roller below and parallel to the soldering horn, said soldering horn being provided at intervals with guide pins to engage the inwardly projecting side seams of the can bodies, substantially as specified.

8. In a can body making machine, the combination with the body former horn, folder wings above said horn and a bumper below said horn, of a soldering horn having a longitudinally extending open channel at its lower portion, a molten solder bath or receptacle, a solder applying roller below and parallel to the soldering horn, said soldering horn being provided at intervals with guide pins to engage the inwardly projecting side seams of the can bodies, said guide pins each having a guide lip or notch, substantially as specified.

9. In a can body making machine, the combination with the body former horn, folder wings above said horn and a bumper below said horn, of a soldering horn having a longitudinally extending open channel at its lower portion, a molten solder bath or receptacle, a solder applying roller below and parallel to the soldering horn; said soldering horn being provided at intervals with guide pins to engage the inwardly projecting side seams of the can bodies, said guide pins opposing the action of the solder applying roller in its tendency to turn the can body on the soldering horn, substantially as specified.

10. In a can body making machine, the combination with the body former horn, folder wings above said horn and a bumper below said horn, of a soldering horn having a longitudinally extending open channel at its lower portion, a molten solder bath or receptacle and a solder applying roller below and parallel to the soldering horn, and a flux applying roller and flux receptacle beneath the soldering horn, substantially as specified.

11. In a can body making machine, the combination with the body former horn having a guide groove in its lower portion to receive the seam, of a soldering horn having a longitudinally extending open channel at its lower portion registering with said guide groove of said body former horn, a molten solder bath or receptacle, a solder applying roller below and parallel to the soldering horn, a flux applying roller and flux receptacle beneath the soldering horn, and a bumper below the body former horn to close the seam against the lower portion of said horn, substantially as specified.

12. In a can body making machine, the combination with the body former horn having a guide groove in its lower portion to receive the seam, of a soldering horn having a longitudinally extending open channel at its lower portion registering with said guide groove of said body former horn, a molten solder bath or receptacle, a solder applying roller below and parallel to the soldering horn, a flux applying roller and flux receptacle beneath the soldering horn, a bumper below the body former horn to close the seam against the lower portion of said horn, and body former wings above the body former horn to wrap the blank downward around the horn, substantially as specified.

13. In a can body making machine, the combination with the body former horn having a guide groove in its lower portion to receive the seam, of a soldering horn having a longitudinally extending open channel at its lower portion registering with said guide groove of said body former horn, a molten solder bath or receptacle, a solder applying roller below and parallel to the soldering horn, a flux applying roller and flux receptacle beneath the soldering horn, a bumper below the body former horn to close the seam against the lower portion of said horn, body former wings above the body former horn to wrap the blank downward around the horn, and a movable clamp for clamping the middle portion of the blank against the body former horn, substantially as specified.

14. In a can body making machine, the combination with the body former horn having a guide groove in its lower portion to receive the seam, of a soldering horn having a longitudinally extending open channel at its lower portion registering with said guide groove of said body former horn, a molten solder bath or receptacle, a solder applying roller below and parallel to the soldering horn, a flux applying roller and flux receptacle beneath the soldering horn, a bumper below the body former horn to close the seam against the lower portion of said horn, body former wings above the body former horn to wrap the blank downward around the horn, a movable clamp for clamping the middle portion of the blank against the body former horn, and movable guides for the ends of the blank, substantially as specified.

15. In a can body making machine, the combination with the body former horn having a guide groove in its lower portion to receive the seam, of a soldering horn having a longitudinally extending open channel at its lower portion registering with said guide groove of said body former horn, a molten solder bath or receptacle, a solder applying roller below and parallel to the soldering horn, a flux applying roller and flux receptacle beneath the soldering horn, a bumper below the body former horn to close the seam against the lower portion of said horn, body former wings above the body former horn to wrap the blank downward around the horn, a movable clamp for clamping the middle portion of the blank against the body former horn and two pairs of opposing clamps for clamping the ends of the body blank, each furnished with a hook forming lip and a pair of rocking hook formers coöperating therewith to form oppositely turned hooks on the opposite ends of the can body blank, substantially as specified.

16. In a can body making machine, the combination with the body former horn having a guide groove in its lower portion to receive the seam, of a soldering horn having a longitudinally extending open channel at its lower portion registering with said guide groove of said body former horn, a molten solder bath or receptacle, a solder applying roller below and parallel to the soldering horn, a flux applying roller and flux receptacle beneath the soldering horn, a bumper below the body former horn to close the seam against the lower portion of said horn, body former wings above the body former horn to wrap the blank downward around the horn, a movable clamp for clamping the middle portion of the blank against the body former horn and two pairs of opposing clamps for clamping the ends of the body blank, each furnished with a hook forming lip and a pair of rocking hook formers coöperating therewith to form oppositely turned hooks on the opposite ends of the can body blank, and a reciprocating conveyer for the can body blanks, substantially as specified.

17. In a can body making machine, the combination with the body former horn having a guide groove in its lower portion to receive the seam, of a soldering horn having a longitudinally extending open channel at its lower portion registering with said guide groove of said body former horn, a molten solder bath or receptacle, a solder applying roller beneath and parallel to the soldering horn, a flux applying roller and flux receptacle beneath the soldering horn, a bumper below the body former horn to close the seam against the lower portion of said horn, body former wings above the body former horn to wrap the blank downward around the horn, a movable clamp for clamping the middle portion of the blank against the body former horn and two pairs of opposing clamps for clamping the ends of the body blank, each furnished with a hook forming lip and a pair of rocking hook formers coöperating therewith to form oppositely turned hooks on the opposite ends of the can body blank, a reciprocating conveyer for the can body blanks and an automatic feeder for the can body blanks, substantially as specified.

18. In a can body making machine, the combination with a can body blank conveyer, of two pairs of blank holding clamps, one clamp of each pair having a hook forming lip thereon, two rocking hook formers, an expansible body former horn having movable wings or segments, two body former wings, a bumper below the body former horn, a soldering horn attached at its end to the body former horn, a roller for supporting the outer end of the soldering horn, a fluxing device below the soldering horn, a solder applying roller parallel to and below the soldering horn and a conveyer for moving the can bodies along the soldering horn, said body former horn having a guide groove at its lower portion to receive the seam and said soldering horn having guide devices registering with said guide groove of the body former horn and engaging the seam to guide and hold the same in coöperative relation with said solder applying roller substantially as specified.

19. In a can body making machine, the combination with a can body blank conveyer, of two pairs of blank holding clamps, one clamp of each pair having a hook forming lip thereon, two rocking hook formers, an expansible body former horn having movable wings or segments and a guide groove at its central lower portion to receive the seam, two body former wings, a bumper below the body former horn, a soldering horn attached at its end to the body former horn, a roller for supporting the outer end of the soldering horn, a fluxing device below the soldering horn, a sectional solder applying roller parallel to and below the soldering horn and a conveyer for moving the can bodies along the soldering horn, said body former horn having a guide groove at its lower portion to receive the seam and said soldering horn having guide devices registering with said guide groove of the body former horn and engaging the seam to guide and hold the same in coöperative relation with said solder applying roller substantially as specified.

20. In a can body making machine, the combination with a can body blank conveyer, of two pairs of blank holding clamps, one clamp of each pair having a hook forming lip thereon, two rocking hook formers, an expansible body former horn having movable wings or segments and a guide groove at its central lower portion to receive the seam, two body former wings, a bumper below the body former horn, a soldering horn attached at its end to the body former horn, a roller for supporting the outer end of the soldering horn, a fluxing device below the soldering horn, a solder applying roller parallel to and below the soldering horn and a conveyer for moving the can bodies along the soldering horn, said soldering horn having a longitudinal channel at its lower part and provided with guide pins to engage the inwardly projecting side seams of the can bodies and prevent the same from turning on the horn under action of the solder applying roller, substantially as specified.

21. In a can body making machine, the combination with a can body blank converey, of two pairs of blank holding clamps, one clamp of each pair having a hook forming lip thereon, two rocking hook formers, an expansible body former horn having movable wings or segments and a guide groove at its central lower portion to receive the seam, two body former wings, a bumper below the body former horn, a soldering horn attached at its end to the body former-horn, a roller for supporting the outer end of the soldering horn, a fluxing device below the soldering horn, a solder applying roller parallel to and below the soldering horn and a conveyer for moving the can bodies along the soldering horn and a movable clamp for clamping the middle portion of the blank against the body former horn preparatory to its being wrapped or formed around the horn, substantially as specified.

22. In a can body making machine, the combination with a can body blank conveyer, of two pairs of blank holding clamps, one clamp of each pair having a hook forming lip thereon, two rocking hook formers, an expansible body former horn having movable wings or segments and a guide groove at its central lower portion to receive the seam, two body former wings, a bumper below the body former horn, a soldering horn attached at its end to the body former horn, a roller for supporting the outer end of the soldering horn, a fluxing device below the soldering horn, a solder applying roller parallel to and below the soldering horn, a conveyer for moving the can bodies along the soldering horn and an automatic can body blank feeder, substantially as specified.

23. In a can body making machine, the combination with an expansible body former horn having movable wings or segments, of a soldering horn attached at its inner end to the body former horn, a solder bath or receptacle below the soldering horn and a solder applying roller below and parallel to the soldering horn, said body former horn having a guide groove at its lower portion to receive the seam and said soldering horn having guide devices registering with said guide groove of the body former horn and engaging the seam to guide and hold the same in coöperative relation with said solder applying roller substantially as specified.

24. In a can body making machine, the combination with an expansible body former horn having movable wings or segments, of a soldering horn attached at its inner end to the body former horn, a solder bath or receptacle below the soldering horn and a solder applying roller below and parallel to the soldering horn, said solder applying roller having annular channels or grooves in its periphery, said body former horn having a guide groove at its lower portion to receive the seam and said soldering horn having guide devices registering with said guide groove of the body former horn and engaging the seam to guide and hold the same in coöperative relation with said solder applying roller substantially as specified.

25. In a can body making machine, the combination with an expansible body former horn having movable wings or segments, of a soldering horn attached at its inner end to the body former horn, a solder bath or receptacle below the soldering horn, a solder applying roller below and parallel to the soldering horn, said solder applying roller having annular channels or grooves in its periphery and a conveyer for moving the can bodies along the soldering horn, said body former horn having a guide groove at its lower portion to receive the seam and said soldering horn having guide devices registering with said guide groove of the body former horn and engaging the seam to guide and hold the same in coöperative relation with said solder applying roller substantially as specified.

26. In a can body making machine, the combination with an expansible body former horn having movable wings or segments, of a soldering horn attached at its inner end to the body former horn, a solder bath or receptacle below the soldering horn, a solder applying roller below and parallel to the soldering horn, said solder applying roller having annular channels or grooves in its periphery and a reciprocating conveyer for intermittently moving the can bodies along the soldering horn, said body former horn having a guide groove at its lower portion to receive the seam and said soldering horn having guide devices registering with said guide groove of the body former horn and engaging the seam to guide and hold the same in coöperative relation with said solder applying roller substantially as specified.

27. In a can body making machine, the combination with two pairs of clamps, one clamp of each pair furnished with a hook forming lip, of a pair of rocking hook formers, a reciprocating conveyer for the can body blanks, a body former horn, means for forming the can body around the horn, a bumper, a soldering horn attached at its inner end to the end of the body former horn, a solder bath and a solder applying roller rotating therein below and parallel to the soldering horn, said body former horn having a guide groove at its lower portion to receive the seam and said soldering horn having guide devices registering with said guide groove of the body former horn and engaging the seam to guide and hold the same in coöperative relation with said solder applying roller substantially as specified.

28. In a can body making machine, the combination with two pairs of clamps, one clamp of each pair furnished with a hook forming lip, of a pair of rocking hook formers, a reciprocating conveyer for the can body blanks, a body former horn, means for forming the can body around the horn, a bumper, a soldering horn attached at its inner end to the end of the body former horn, a solder bath and a solder applying roller rotating therein below and parallel to the soldering horn, and a roller for supporting the outer end of the soldering horn, said body former horn having a guide groove at its lower portion to receive the seam and said soldering horn having guide devices registering with said guide groove of the body former horn and engaging the seam to guide and hold the same in coöperative relation with said solder applying roller substantially as specified.

29. In a can body making machine, the combination with two pairs of clamps, one clamp of each pair furnished with a hook forming lip, of a pair of rocking hook formers, a reciprocating conveyer for the can body blanks, a body former horn, means for forming the can body around the horn, a bumper, a soldering horn attached at its inner end to the end of the body former horn, a solder bath and a solder applying roller rotating therein below and parallel to the soldering horn, and a roller for supporting the outer end of the soldering horn, said soldering horn having at its outer end a coöperating roller, said body former horn having a guide groove at its lower portion to receive the seam and said soldering horn having guide devices registering with said guide groove of the body former horn and engaging the seam to guide and hold the same in coöperative relation with said solder applying roller substantially as specified.

30. In a can body making machine, the combination with two pairs of clamps, one clamp of each pair furnished with a hook forming lip, of a pair of rocking hook formers, a reciprocating conveyer for the can body blanks, a body former horn, means for forming the can body around the horn, a bumper, a soldering horn attached at its inner end to the end of the body former horn, a solder bath and a solder applying roller rotating therein below and parallel to the soldering horn, and a roller for supporting the outer end of the soldering horn, said soldering horn having at its outer end a coöperating roller and a cooling device and a conveyer for the cooling device, said body former horn having a guide groove at its lower portion to receive the seam and said soldering horn having guide devices registering with said guide groove of the body former horn and engaging the seam to guide and hold the same in coöperative relation with said solder applying roller substantially as specified.

31. In a can body making machine, the combination with a can body blank conveyer, of two pairs of blank holding clamps, one clamp of each pair having a hook forming lip thereon, two rocking hook formers, an expansible body former horn having movable wings or segments, two body former wings, a bumper below the body former horn, a soldering horn attached at its end to the body former horn, a roller for supporting the outer end of the soldering horn, a fluxing device below the soldering horn, a solder applying roller parallel to and below the soldering horn, a conveyer for moving the can bodies along the soldering horn, said soldering horn having a roller at its outer end and a coöperating roller for supporting the outer end of the soldering horn, said body former horn having a guide groove at its lower portion to receive the seam and said soldering horn having guide devices registering with said guide groove of the body former horn and engaging the seam to guide and hold the same in coöperative relation with said solder applying roller substantially as specified.

32. In a can body making machine, the combination with a body former horn having a groove at its lower portion to receive the seam, of a soldering horn attached at its inner end to the body former horn, a molten solder receptacle below the soldering horn, a solder applying roller below and parallel to the soldering horn, means for moving the can bodies along the soldering horn with the seams thereof tangentially in contact with said solder applying roller and with the crevice of the seam to one side of the line of contact of the can body with the surface of the solder applying roller, and means for rotating the solder applying roller in the direction to cause the solder coated surface of the roller to first reach the crevice of the seam and then said line of contact with the can body, substantially as specified.

FRANK RUDOLPHI.

Witnesses:
H. M. MUNDAY,
PEARL ABRAMS.